United States Patent
Zeinali

[19]

[11] Patent Number: 5,868,480
[45] Date of Patent: *Feb. 9, 1999

[54] IMAGE PROJECTION APPARATUS FOR PRODUCING AN IMAGE SUPPLIED BY PARALLEL TRANSMITTED COLORED LIGHT

[75] Inventor: Mehdi Zeinali, Spring, Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 773,793

[22] Filed: Dec. 17, 1996

[51] Int. Cl.⁶ .................................................. G03B 21/14
[52] U.S. Cl. ................................ 353/31; 353/84; 345/32
[58] Field of Search ................................. 353/31, 84, 99; 349/106, 108, 114, 5; 345/31, 32, 33, 88, 87

[56] References Cited

U.S. PATENT DOCUMENTS

| | | | |
|---|---|---|---|
| 5,083,857 | 1/1992 | Hornbeck | 359/291 |
| 5,102,217 | 4/1992 | Takafuji et al. | 353/84 |
| 5,148,157 | 9/1992 | Florence | 340/783 |
| 5,233,385 | 8/1993 | Sampsell | 355/35 |
| 5,313,479 | 5/1994 | Florence | 372/26 |
| 5,404,076 | 4/1995 | Dolan et al. | 313/572 |
| 5,416,618 | 5/1995 | Juday | 359/53 |
| 5,453,859 | 9/1995 | Sannohe et al. | 359/63 |
| 5,467,146 | 11/1995 | Huang et al. | 348/743 |
| 5,467,206 | 11/1995 | Loiseaux et al. | 349/5 |
| 5,471,584 | 11/1995 | Blaxtan et al. | 359/263 |
| 5,486,881 | 1/1996 | Hwang | 353/31 |
| 5,508,841 | 4/1996 | Lin et al. | 359/318 |
| 5,513,025 | 4/1996 | Watanabe | 349/106 |
| 5,523,881 | 6/1996 | Florence et al. | 359/561 |
| 5,546,206 | 8/1996 | Nakanishi et al. | 349/5 |
| 5,548,349 | 8/1996 | Mizuguchi et al. | 349/5 |
| 5,555,324 | 9/1996 | Waxman et al. | 382/254 |
| 5,608,555 | 3/1997 | Smith | 349/5 |
| 5,621,550 | 4/1997 | Oku | 349/108 |
| 5,623,348 | 4/1997 | Ogino | 353/31 |
| 5,623,349 | 4/1997 | Clarke | 349/106 |

OTHER PUBLICATIONS

Parfenov, A.V. and Putilin, A.N., "Advanced Optical Schemes with Liquid Crystal Image Converters for Display Applications," SPIE vol. 2650, pp. 173–179 (Jul. 1996).

Baur, T. et al., "High Performance Liquid Crystal Device Suitable for Projection Display," SPIE vol. 2650, pp. 226–228 (Jul. 1996).

Displaytech, Inc., "FLC/VLSI Display Technology"(Dec. 1, 1995).

Gambogi, W.J. et al., "Color Holography Using DuPont Holographic Recording Films," Proc. SPIE, Holographic Materials, vol. 2405 (Feb. 1995).

Tipton, D. et al., "Improved Process of Reflection Holography Replication and Heat Processing," Proc. SPIE, Practical Holography VIII, Materials and Processing, vol. 2176 (Feb. 1994).

(List continued on next page.)

*Primary Examiner*—William Dowling
*Attorney, Agent, or Firm*—Arnold, White & Durkee

[57] ABSTRACT

A projection apparatus provides a projection engine that supplies polarized light to a dielectric filter (or diffraction grating). The dielectric filter provides an array of pixels that each pass selected colors of light and reflect other colors. Each pixel is subpixelated (for example, red, green, and blue subpixels) so that a single subpixel passes a selected color (for example, red) and reflects the other colors (for example, green and blue). A digital micromirror device has an array of mirrors that correspond in number to the number of subpixels of the dielectric filter. Each of the mirrors provide "on" and "off" positions for selectively transmitting a desired color of light from the mirror to an image screen. The image screen receives light reflected by selected of the mirrors of the array of micromirrors when the selected mirrors are in the "on" position. The micromirror device can be controlled with a computer, television, signal, video signal, or the like.

23 Claims, 4 Drawing Sheets

OTHER PUBLICATIONS

Gambogi, W., et al., "HOE Imaging in DuPont Holographic Photopolymers, " Proc. SPIE, Diffractive and Holographic Optics Technology vol. 2152 (1994).

Gambogi, W.J. et al., "Advances and Applications of DuPont Holographic Photopolymers,"Optics Quebec 93, Conf. 2043, Holographic Imaging and Materials (Aug. 1993).

Gambogi, W.J. et al., "Diffractive Printing Methods Using Volume Holograms," IS&T/SPIE 1993 Int'l Conf. on Electronic Imaging, conf. 1914 (1993).

Gambogi, W.J. et al., "Holographic Transmission Elements Using Improved Photopolymer Films, "SPIE vol. 1555 Computer and Optically Generated Holographic Optics (Fourth in a Series), pp. 256–266 (1991).

Weber, A.M. et al., "Hologram Recording in DuPont's New Photopolymer Materials," Practical Holography IV, SPIE OE/Lase Conference Proceedings, 1212–04 (Jan. 1990).

Handbook of Optics, vol. II, Devices, Measurements, and Properties, "Chapter 3–Polarizers".

"Chapter 8–Liquid Crystal Displays, "pp. 181–251.

"Optics for Image Disposition Systems".

Joubert, C. et al., "Dispersive Holographic Microlens Matrix for Single LCD Projecton.".

FIG. 4
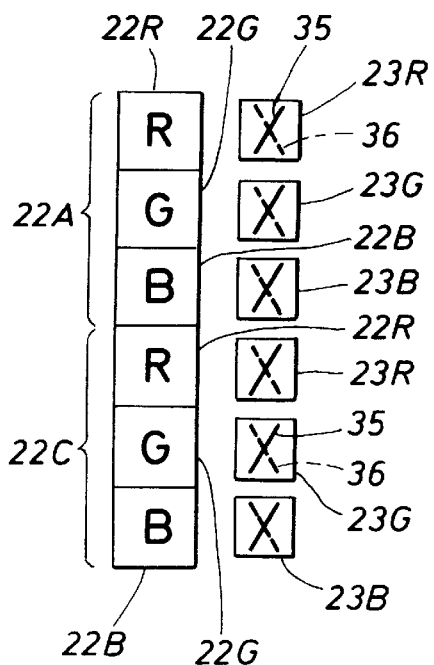
FIG. 5
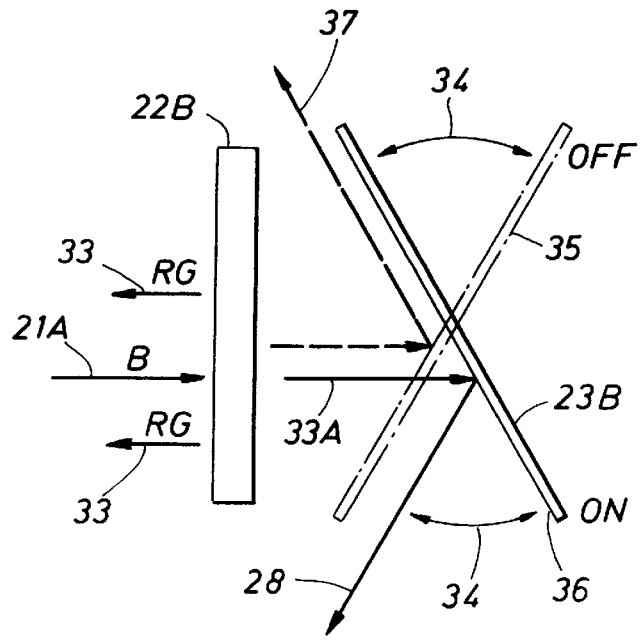
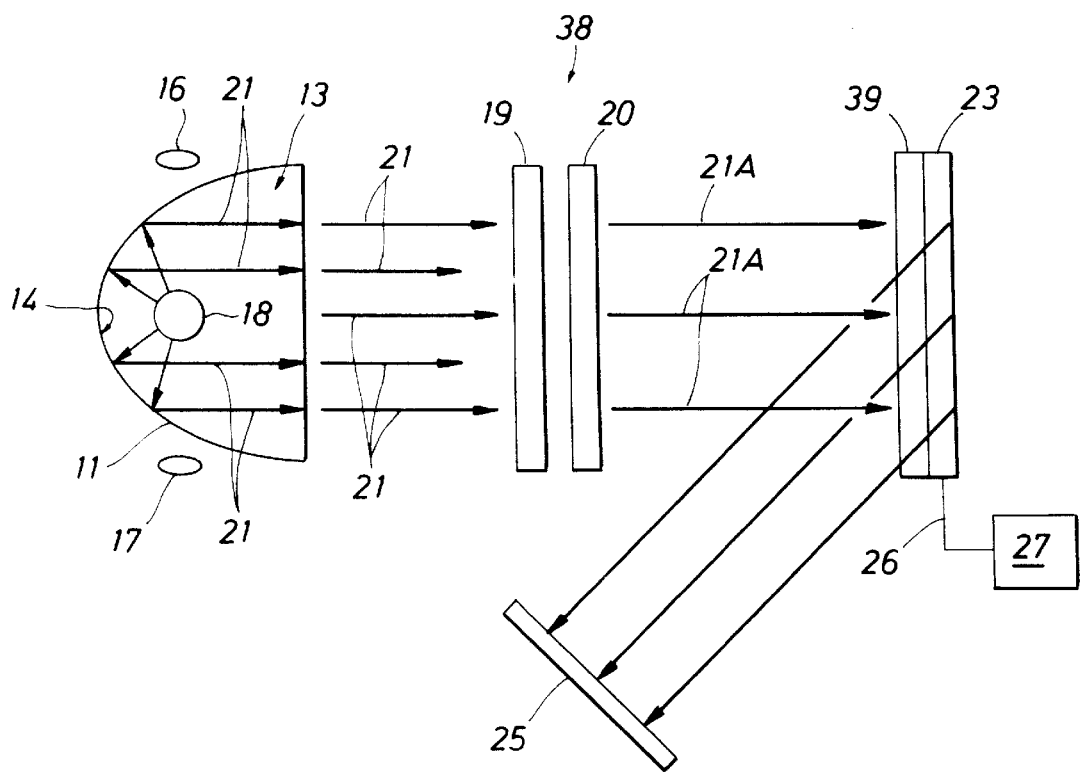
FIG. 6

IMAGE PROJECTION APPARATUS FOR PRODUCING AN IMAGE SUPPLIED BY PARALLEL TRANSMITTED COLORED LIGHT

BACKGROUND OF THE INVENTION

1. Field of the Invention

The present invention relates to an improved image projection system that uses a filter (holographic, dielectric, or diffraction grating) that is subpixelated to pass selected colors of light (preferably one color of light for each subpixel) to a micromirror device that has an array of mirrors corresponding in number the number of subpixels of the dielectric filter or to a liquid crystal display device. Even more particularly the present invention relates to a projection system having a subpixelated dielectric filter that each pass a selected color light (reflecting others) to a micromirror or a LCD device to define a parallel color device that simultaneously transmits multiple rays of light of selected colors to an image screen rather than sequential transmission of the color rays.

2. Description of the Related Art

Projection systems are used to display images on large surfaces, such as movie or television screens. For example, in a front projection system, an image beam is projected from an image source onto the front side of a reflection-type angle transforming screen, which then reflects the light toward a viewer positioned in front of the screen. In a rear projection system, the image beam is projected onto the rear side of a transmission-type angle transforming screen and transmitted toward a viewer located in front of the screen.

In prior co-pending U.S. patent application Ser. No. 08/581,108, entitled "Projecting Images," to Knox, filed Dec. 29, 1995, there is disclosed a method of displaying an optical image by projecting the image along an optical path and at an optical device interposed across the optical path, at one time reflecting the image from the optical device and at a different time permitting the image to pass through the optical device to be displayed.

One requirement for such an image projection systems is that a linearly polarized image be presented so that the image first is reflected off the screen surface and the second time is transmitted through the screen surface after a 90° rotation of the polarization. Systems have been previously disclosed that attempt to provide such a polarized image. For example, in U.S. Pat. No. 5,453,859, a system is shown that uses a polarization beam splitter along with a dichroic "X-cube" to create a color polarized image.

Displaytech, Inc., in a 6-page technical disclosure entitled "FLC/VLSI Display Technology" and dated 1 Dec. 1995; Parfenov, et al., in "Advanced optical schemes with liquid crystal image converters for display applications," SPIE Proceedings, Volume 2650, pages 173–179 (29–31 Jan. 1996); and Baur, et al., in "High performance liquid crystal device suitable for projection display," SPIE Proceedings, Volume 2650, pages 226–228 (29–31 Jan. 1996), disclose general background information on the use of liquid crystal devices to process video images. The disclosures referred to in this paragraph are hereby incorporated herein by reference.

One type of image generating reflector that can be used in a projection system is a deformable micromirror device. Such as device has mechanical micromirrors that are created in a semi-conductor device through semiconductor techniques. These are known to the art and are described, for example, in U.S. Pat. No. 5,083,857 issued to Larry J. Hornbeck entitled "Multi-Level Deformable Mirror Device." That patent is hereby incorporated by reference and further discloses the details of micromirror devices.

Micromirror devices, however, are not color selected. That is, they typically are color sequential when used in display systems. This is because they simply reflect whatever light hits them, they have no need for any masking technologies.

A variety of "image engines" are used for image projection systems. One type of engine is a "sequential color" engine, in which a red image, green image, blue image, or other three contrasting color images, are sequentially transmitted at high speed. The perceptual result is a color image that is a combination of the three. Such images allow a single monochrome image source to be used, with appropriate color filtering.

A problem with such sequential engines, however, is that they typically must operate at a high rate of speed. This typically limits such sequential image engine to on/off liquid crystal displays, or other on/off systems, instead of analog systems. (Analog systems are typically too slow.) Even then, it is difficult to create a large number of colors because of timing considerations.

An alternative is to provide color pixels. A problem with color pixels, however, is typically they have used absorptive color filters. For example, on a color active matrix liquid crystal display used on a laptop computer, each pixel is colored red, green, or blue, and transmits its selected color, but absorbs the remaining frequencies. This is fine for a laptop display, but can cause problems with the very high intensity light sources used in projection systems because of heating.

Further, when colorized pixels are used, they typically absorb the unused light, thus reducing efficiency. Because effectively two-thirds of the light for each pixel is absorbed rather than transmitted, only one-third of the original light source is actually used. In image projection systems, this requires even brighter light sources to achieve the same luminance.

Subpixelated systems also have had the problem that color purity is to be degraded by crossover from adjacent subpixels. That is, some of the light destined for one pixel may bleed into the adjacent pixel, degrading the color purity.

SUMMARY OF THE INVENTION

A technique is provided for creating a non-color sequential image using monochromatic display technologies. Specifically, for a projection display system, techniques are disclosed using reflective color filters, diffraction gratings, and holographic reflectors such that colored subpixels are created in a display system. This allows monochromatic devices, such as LCD's and deformable micromirror devices, to operate in other than color sequential mode.

The dielectric filter (or a diffraction grating in a second embodiment) provides an array of pixels that each pass selected colors of light and reflect other colors. Each pixel is preferably subpixelated, preferably three subpixels in each pixel. A single pixel passes selected color light waves for multiple selected colors (e.g., red, green and blue). Each subpixel passes a single selected color, such as red, green, or blue.

A deformable micromirror device ("DMD") provides an array of micromirrors. The number of micromirrors correspond in number to the number of subpixels of the dielectric filter. Each mirror has "on" and "off" positions. In an "on" position, the mirror reflects a single color of light such as red, green, or blue, to an image screen. In the "off" position, the mirror reflects light away from the image screen and a black or darkened spot appears at that location on the image screen.

The dielectric filter preferably passes red, blue, and green light, each of the pixels of the dielectric filter being subpixelated to provide red, green, and blue subpixels. Correspondingly, the deformable micromirror device provides an array of micromirrors, including one micromirror for each subpixel of the dielectric filter.

Further, similar techniques can be used for monochrome liquid crystal displays. Replacing the deformable micromirror device with a monochrome liquid crystal display, the dielectric filters pass selected colors, but reflect a remainder, or alternatively diffracts appropriate portions of each color to an appropriate pixel. This is also possible with a holographic reflector or diffraction grating.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 4 is a fragmentary schematic view of the preferred embodiment of the apparatus of the present invention illustrating the placement of dielectric filter subpixels and associated micromirrors;

FIG. 5 is a schematic view illustrating operation of a subpixel of the dielectric filter and operation of an associated micromirror;

FIGS. 6, 7A, and 7B are schematic views of an alternate embodiment of the apparatus of the present invention that uses diffraction grating;

DETAILED DESCRIPTION OF THE PREFERRED EMBODIMENT

Figure 1:
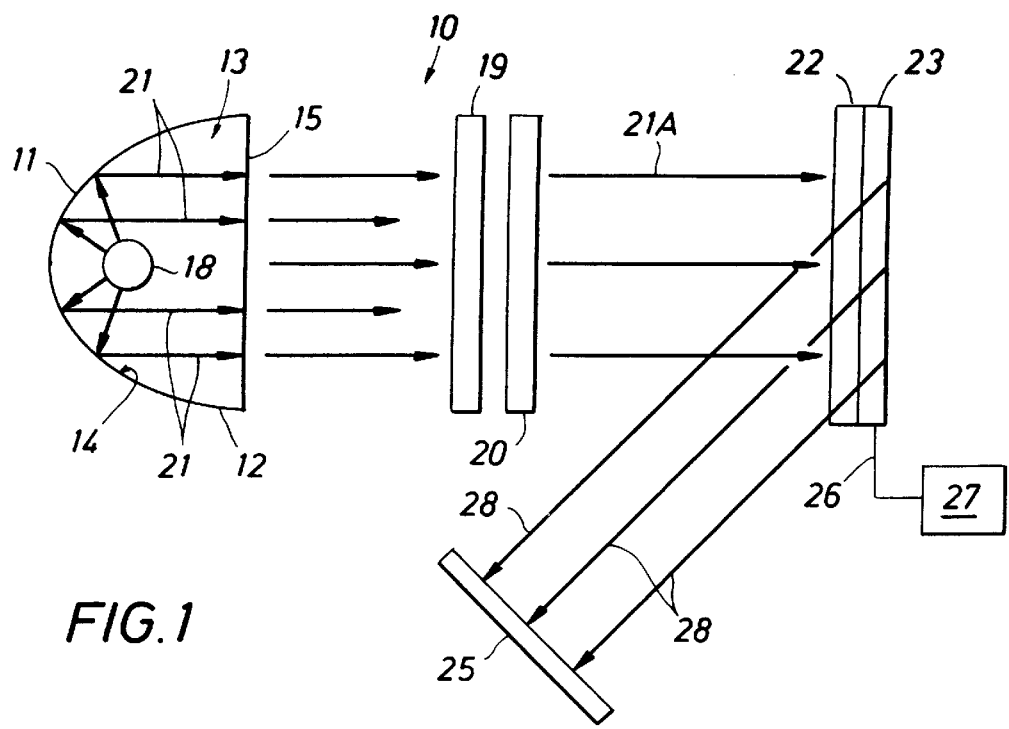
FIG. 1 is a schematic view of the preferred embodiment of the apparatus of the present invention.
Figure 2:
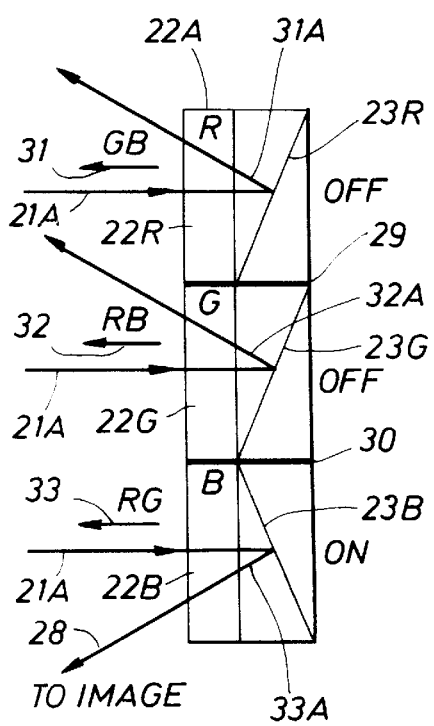
FIG. 2 is a fragmentary schematic view of the preferred embodiment of the apparatus of the present invention illustrating a portion of the dielectric filter and micromirror device.
Figure 3:
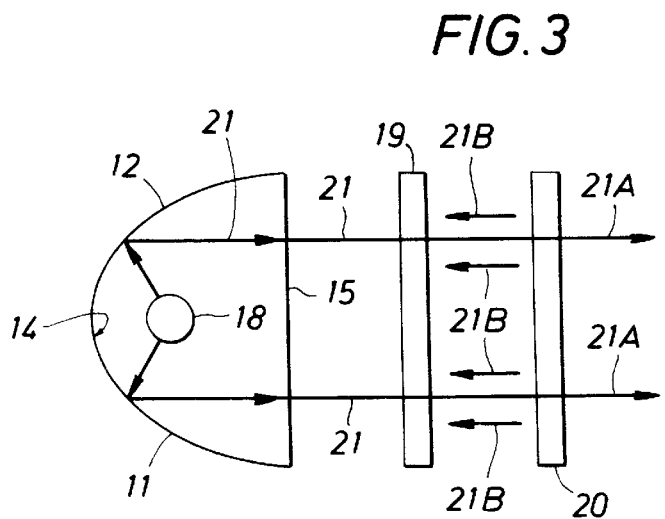
FIG. 3 is a fragmentary schematic view of the preferred embodiment of the apparatus of the present invention illustrating the lamp portion thereof.

FIGS. 1–3 show generally the preferred embodiment of the apparatus of the present invention designated generally by the numeral 10 in FIG. 1. Projection apparatus 10 includes a lamp 11 that has an outer housing 12. The housing 12 has an inner reflecting surface 14 that can be parabolic for collimating light rays 21.

Housing 12 interior 13 can contain a gas that can be excited to form a plasma light source 18 of intense heat. A lens 15 of clear heat resistant material such as quartz forms a closed gas containing structure with lamp body 12. The operation of lamp 11 to produce plasma light source 18 is discussed more particularly in U.S. patent application Ser. No. 08/747,190, entitled "High Efficiency Lamp Apparatus for Producing a Beam of Polarized Light," to Knox, et al., filed Nov. 12, 1996, and incorporated herein by reference. Other light sources can also be used.

Light rays 21 from plasma 18 exit lamp 11 and pass through retarder 19 and then reflecting polarizer 20. Light rays 21A indicate light rays that have been transmitted through both retarder 19 and reflecting polarizer 20. The light rays 21 designate light rays that have been reflected back to lamp 11 for reabsorption and retransmittance (i.e., recovery of unneeded polarizations or wavelengths).

Dielectric filter 22 is positioned to receive transmitted light rays 21A. Dielectric filter 22 includes an array of pixels 22A, each having subpixel segments 22R, 22G, and 22B. The subpixel 22R is a subpixel which allows red light to pass therethrough while reflecting green and blue light. The subpixel 22G allows green light to pass therethrough while reflecting red and blue light. The subpixel 22B allows blue light to pass therethrough while reflecting red and green light.

Of note, the dielectric filter 22 is a reflective filter rather than an absorptive filter. In projection display systems, the light source is generally very intense. In prior art systems, absorptive filters have been used for subpixels. That is, a red filter would transmit red light but absorb green and blue light. This is disadvantageous in a projection system, or in another system employing a bright light, because of potential heating problems. By using reflecting dielectric filters, this reduces or eliminates the potential heating problems.

Further, using a reflective dielectric filter, it is relatively simple to achieve the desired screen resolution. This is because such a filter can be manufactured using standard semiconductor techniques.

At the dielectric filter 22, red, green, and blue light rays are selectively filtered by some subpixels and allowed to pass through other pixels. This produces red, green, and blue light that is then controllably reflected to image screen 25 using deformable micromirror device 23.

The deformable micromirror device 23 is a type of spatial light modulator ("SLM"). Deformable micromirror device 23 is made of square pixels that are computer controlled to switch either "on" or "off". The semiconductor design of deformable micromirror devices makes it possible to control their movement with digital precision and as a result, the deformable micromirror device reflects light shown on it, creating a high quality image that can be projected to screen 25.

Computer 27 is connected via link 26 to deformable micromirror device 23. The deformable micromirror device is a pixelated micromechanical spatial light modulator formed monolithically on a silicon substrate using a complimentary metal oxide semiconductor ("CMOS") process. The micromirrors of the deformable micromirror device are arranged in an array such as an X-Y array.

Each micromirror can switch plus or minus 10 degrees to define the "on" and "off" position. For example, if one of the micromirrors is rotated to a +10 degrees, it will reflect the incoming light to projection screen 25. The micromirror appears bright ("on") on the projection screen 25. When the mirror is switched –10 degrees, the reflective light misses the screen 25 and appears dark ("off").

The present invention uses dielectric filter 22 that is formed of an array of pixels. In FIG. 2, a single pixel 22A of dielectric filter 22 is shown. The pixel 22A includes three subpixels 22R, 22G, and 22B. In FIG. 2, the subpixel 22R is a subpixel which allows red light to pass therethrough while reflecting green and blue light. The arrow 21A designates light that has red, green, and blue components before reaching subpixel 22R. The arrow 31 indicates that green and blue light have been reflected by the subpixel 22R while red light 3 1A strikes a micromirror 23R of deformable micromirror device 23.

The subpixel 22G of dielectric filter 22 receives light rays 21A having red, green, and blue components. Red and blue components are reflected by the subpixel 22G and green light passes through the subpixel 22G, designated by the arrow 32. The green light 32A reaches micromirror 23G.

Light 21A reaches subpixel 22B of dielectric filter 22. Red and green light components are reflected by the subpixel 22B as indicated by the arrow 33 in FIG. 2. Arrow 33A indicates that blue light passes through the subpixel 22B and strikes micromirror 23B. In FIG. 2, the subpixel 22B allows blue light to pass through, striking micromirror 23B. The micromirror 23B is indicated in the "on" position so that light is reflected as arrow 28 to screen 25. However, in FIG. 2, micromirrors 23R and 23G are both indicated in the "off" position so that they would appear dark to the image screen 25.

In FIG. 2, there can be provided dark or black spaces 29, 30 in between subpixels 22R and 22G, and in between 22G and 22B of dielectric filter 22. The black border or mask 29, 30 prevents reflection of RGB components to an adjoining micromirror, thus enhancing the image.

FIGS. 4 and 5 illustrate more particularly the operation of dielectric filter 22 to control the transmission of light to micromirrors 23R, 23G, and 23B. In FIG. 4, two pixels 22A and 22C of dielectric filter 22 are shown. Because each pixel 22A, 22C of dielectric filter 22 includes three subpixels, FIG. 4 provides red, green, and blue subpixels 22R, 22G, 22B for each of the pixels 22A, 22C. Therefore, FIG. 4 shows six (6) subpixels for purposes of illustration. Behind each of the subpixels 22R, 22G, 22B is provided a corresponding micromirror 23R, 23G, 23B. In FIG. 4, the position 35 indicates an "off" position while the hyphenated position 36 indicates an "on" position.

In FIG. 5, a light ray 21A containing red, green, and blue components is shown being transmitted to subpixel 22B. Arrows 33 indicate a reflection of red and green light components. Arrow 33A indicates transmission of blue light to reach micromirror 23B. In FIG. 5, both "on" and "off" positions of micromirror 23B are shown. Arrows 34 schematically indicate the movement of a micromirror 23B between "off" (35) and "on" (36) positions. Reflective light designated by the arrow 28 is light that will strike screen 25. Arrow 37 indicates light that will be reflected away from screen 25.

Figure 7B:
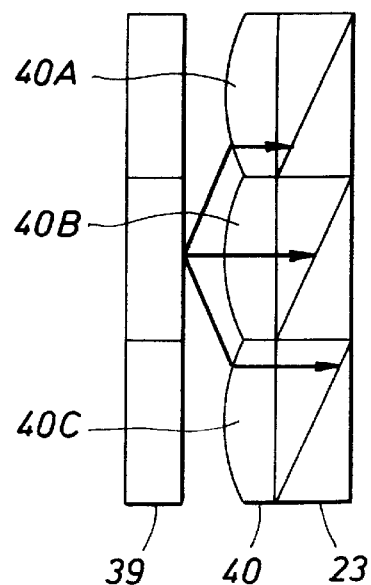
Figure 7A:
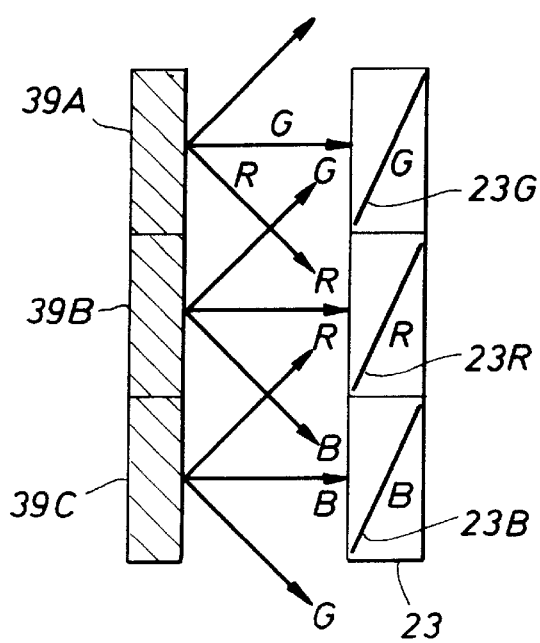

FIGS. 6, 7A, and 7B show an alternate embodiment of the apparatus of the present invention designated generally by the numeral 38 in FIG. 6. Projection apparatus 38 includes a lamp 11, filters 19 and 20, and a deformable micromirror device 23. In the embodiment of FIG. 6, dielectric filter 22 has been replaced with diffraction grating 39. In FIG. 7A, diffraction grating 39 includes three pixels or sections 39A, 39B, 39C that receive light rays 21A from filters 19, 20. Diffraction grating 39 generates blue, green, and red color components as shown. The micromirror device 23 includes a green micromirror 23G, a red micromirror 23R, and a blue micromirror 23B. The diffraction grating 39 splits the light as shown in FIG. 7A so that each of the sections 39A, 39B, 39C directs the correct color light component to the micromirror 23R, 23B, 23G.

Red light, as shown in FIG. 7A, is transmitted from each of the sections 39A, 39B, 39C to the red mirror 23R. Correspondingly, each of the sections 39A, 39B, 39C directs green light to mirror 23G. Each of the sections 39A, 39B, 39C directs blue light to mirror 23B. Thus, the diffraction grating 39 provides an array of sections (such as 39A) that correspond in number to the array of micromirrors (such as 23G) of the micromirror device 23. As with the preferred embodiment, the micromirrors are switched between "on" and "off" positions as shown in FIG. 5 so that a computer can control operations of the micromirror device 23 to selectively transmit color from a selected micromirror to the screen 25.

Further, instead of using the diffraction grating 39, the diffraction grating 39 can instead be a diffracting holographic material. That is, each of the sections 39A, 39B, and 39C would again appropriately direct the light to the appropriate micromirror, but using a holographic material rather than a diffraction grating.

In these embodiments, the light returned by the micromirrors is preferably returned through a section of the diffraction grating 39 or the holographic material such that the diffracting effects of the material through which the light is returned appropriately direct the light to the screen 25.

Turning to FIG. 7B, shown is a modification of the embodiment of FIG. 7A. A microlens array 40 has been added in this embodiment. This array could be formed using integrated circuit fabrication techniques, or through other known methods, and serves to focus the light onto the appropriate mirror 23.

Figure 8A:
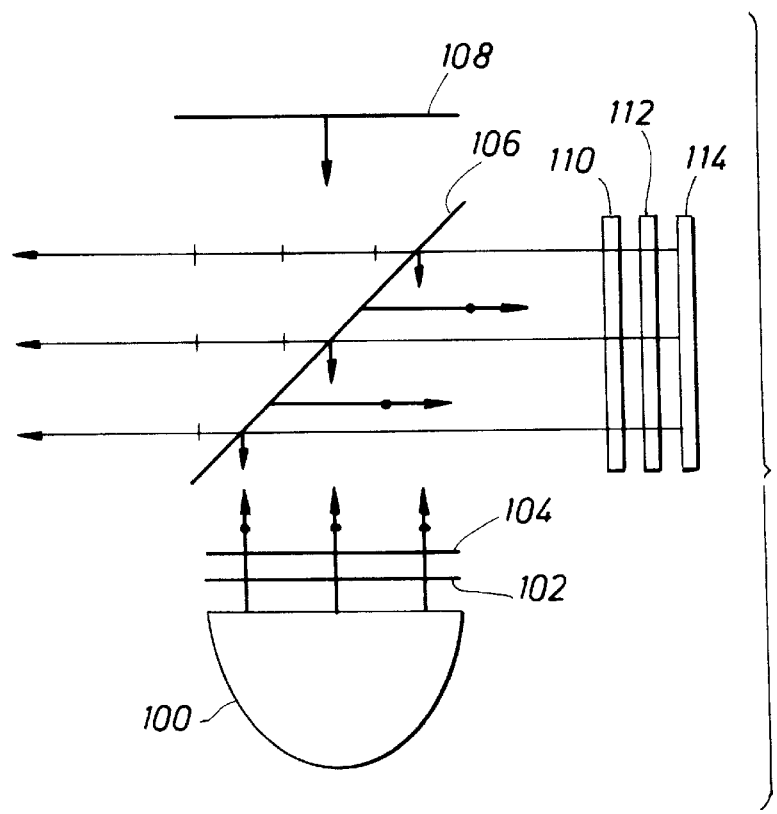
FIGS. 8A, 8B, and 9 are alternative embodiments illustrating a system for developing a polarized image using a monochrome liquid crystal display according to the invention.
Figure 8B:
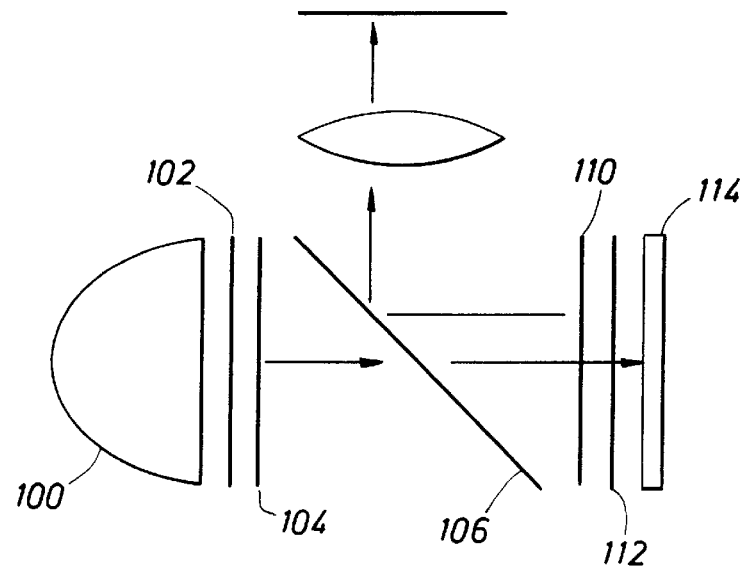

The present invention thus provides a parallel color device, rather than a sequential color device. The above described techniques can also be used with liquid crystal displays. Turning to FIG. 8A, illustrated is a polarization based system for creating a polarized image for display on a screen. Beginning with a light source 100, which can be similar to the lamp 12, light is projected first through a retarder 102 and then through a polarization filter 104. This light is S-polarized, and then strikes a reflective polarizing film 106, such as DBEF manufacturing by Minnesota Mining & Manufacturing Co. of Minneapolis, Minn. Alternatively, the polarizer 104 can be eliminated, and a reflector 108 placed behind the reflective polarizing film 106 to reflect light back to the lamp 100 if the lamp 100 is capable of reabsorbing and reemitting the reflected light. FIG. 8B shows an alternative arrangement where the light source 100 is collinear with the mirror 114.

The S-polarized light is reflected off the reflecting film 106 first through a dielectric array (similar to the array 39) or diffraction grating 110 (similar to the grating 39), then through an LCD 112, and then on to a mirror 114. The diffraction grating 110 could instead be a holographic material. As will be appreciated, in this way a monochrome LCD 112, such as a ferroelectric LCD, can be used, or an analog spatial light modulating LCD. It will be appreciated that the unneeded light, if the grating 110 is an array of reflective dielectric as illustrated in FIG. 2, is reflected back to the lamp 100, allowing for reabsorption and retransmittance.

Figure 9:
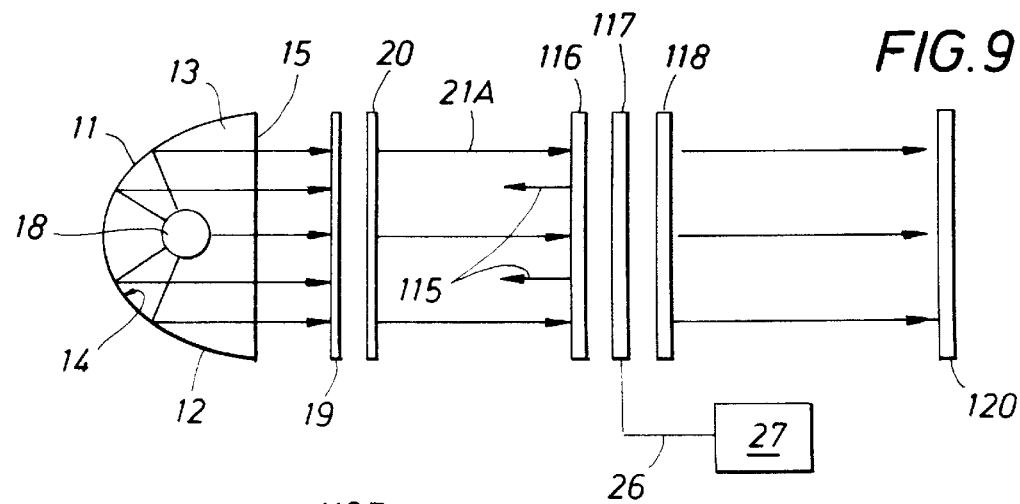
Figure 10:
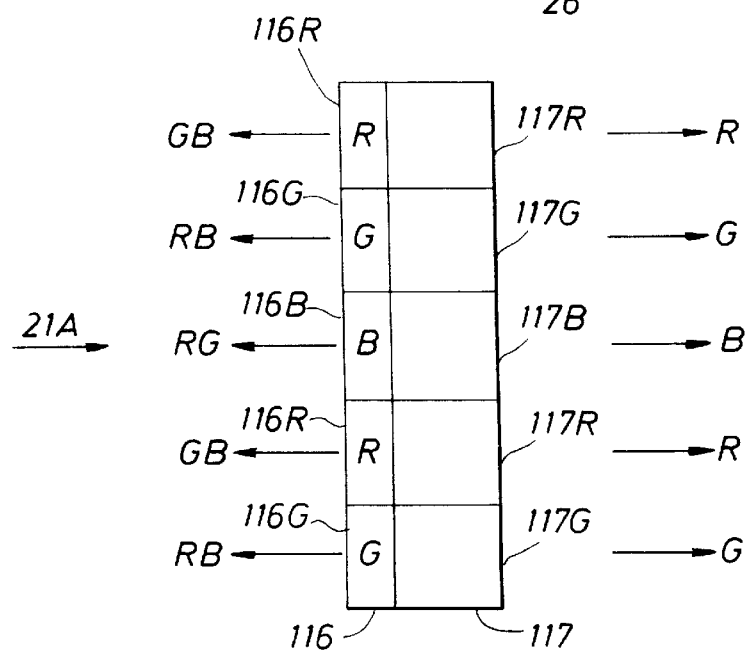
FIG. 10 is a diagram illustrating the use of holographic or dielectric reflecting devices to improve the efficiency used with the monochrome liquid crystal displays according to the invention.

Turning to FIG. 9, an alternative embodiment employing a liquid crystal display is shown. In this case, the same lamp 11 is used, again providing light to the retarder 19 and the polarizer 20. In this case, however, a reflective filter 116 is followed by an LCD array 117, controlled by the computer 27, and the light is passed on to a second polarizer 118. The LCD 117 shifts the polarity of the light that is to make up the image, so that the image then passes through polarizer 118. Referring to FIG. 10, the reflective filter 116 is effectively the same as the filter 22 of FIG. 2. Each subpixel of the LCD 117 has a corresponding filter of the reflective filter 116. Thus, the red reflective filter 116R reflects green and blue light and transmits red light, with the green and blue subpixels acting similarly. This reflective filter can be a dielectric filter, or can be made of holographic materials.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A projection apparatus comprising:
   a) a light source;
   b) a filter that has an array of pixels that each pass selected colors of light and reflect other colors, each pixel being subpixelated so that a single pixel passes selected light rays for selected colors, each subpixel passing a selected color;
   c) a display device that has an array of pixels, the number of pixels corresponding in number to the number of subpixels of the filter, wherein each pixel is individually energizable, the display device positioned adjacent to said filter; and
   d) a controller for controlling the display device.

2. The projection apparatus of claim 1, wherein the filter is a reflective dielectric filter.

3. The projection apparatus of claim 1, wherein the filter is a diffraction grating.

4. The projection apparatus of claim 1, wherein the filter is a reflective holographic filter.

5. The projection apparatus of claim 1, wherein the display device is a deformable micro-mirror device.

6. The projection apparatus of claim 1, wherein the display device is a parallel color device, simultaneously transmitting multiple rays of light of selected colors to the image screen rather than sequential transmission of color rays.

7. The projection apparatus of claim 1, wherein the display device is a liquid crystal display.

8. The projection apparatus of claim 1, wherein the filter reflects blue and green light.

9. The projection apparatus of claim 1, wherein the filter passes red, green and blue light.

10. The projection apparatus of claim 1, wherein the filter has three subpixels for each of its pixels, and the subpixels respectively pass red, green and blue light, reflecting light of other color.

11. The projection apparatus of claim 10, wherein the display device has three mirrors corresponding in size and placement of the filter subpixels.

12. The projection apparatus of claim 1, wherein the filter has multiple subpixel filter segments.

13. The projection apparatus of claim 1, wherein the filter has multiple subpixel filter segments placed over the pixels of the display device.

14. The projection apparatus of claim 1, wherein the filter passes selected color rays of light and reflects all other light back to the lamp for reabsorption.

15. The projection apparatus of claim 1, wherein the controller is driven by a computer.

16. The projection apparatus of claim 15, wherein the controller is driven by a computer that generates computer video signals.

17. The projection apparatus of claim 15, wherein the controller receives television signals.

18. The projection apparatus of claim 1, wherein the display device reflects an image to a projection screen.

19. The projection apparatus of claim 1, wherein the display device passes an image to a projection screen.

20. The projection apparatus of claim 19, wherein the light source provides light of a first polarity, wherein the display device is a liquid crystal display, and wherein between the display device and the projection screen a polarizing filter is disposed, and wherein the LCD shifts the polarity of the light from the light source forming an image.

21. The projection apparatus of claim 20, wherein the filter is a reflective dielectric filter.

22. The projection apparatus of claim 20, wherein the filter is a reflective holographic filter.

23. The projection apparatus of claim 1 further comprising a microlens array between said filter and said display device.

* * * * *

Disclaimer 5,868,480 - Mehdi Zeinali, Spring, Texas. IMAGE PROJECTION APPARATUS FOR PRODUCING AN IMAGE SUPPLIED BY PARALLEL TRANSMITTED COLORED LIGHT. Patent dated Feb. 9, 1999. Disclaimer filed Sept. 22, 1999, by the assignee, Compaq Computer Corporation.

Hereby enters this disclaimer to claim 14 of said patent.

*(Official Gazette,* December 28, 1999)